B. F. PURVIANCE.
NUT LOCK.
APPLICATION FILED APR. 13, 1911.

1,016,710.

Patented Feb. 6, 1912.

Witnesses

Inventor
B. F. Purviance

By
Attorneys

UNITED STATES PATENT OFFICE.

BENJAMIN F. PURVIANCE, OF BROOKPARK, MINNESOTA, ASSIGNOR OF ONE-HALF TO BYRON J. KELSEY, OF BROOKPARK, MINNESOTA.

NUT-LOCK.

1,016,710.  Specification of Letters Patent.  Patented Feb. 6, 1912.

Application filed April 13, 1911. Serial No. 620,921.

*To all whom it may concern:*

Be it known that I, BENJAMIN F. PURVIANCE, citizen of the United States, residing at Brookpark, in the county of Pine and State of Minnesota, have invented certain new and useful Improvements in Nut-Locks, of which the following is a specification.

This invention relates to a nut lock, and has for its object to provide a washer of peculiar configuration which may be applied to a bolt and nut whether used upon a foundation of wood or metal, and which is adapted to securely hold the nut in an adjusted position upon the bolt. With this object in view the washer is provided with a bolt opening and with an arcuate periphery, the said washer being incised from its periphery inward, the incisions crossing each other within the periphery of the washer, whereby an angular prong is formed within the marginal portion of the washer, and a section of the marginal portion at the point of the prong is removed leaving an open space. The marginal portion of the washer at the sides of the said space and beyond the end of the prong is distorted out of the plane of the middle portion of the washer, in order that they may be readily bent up against the sides of a nut to hold the same.

Figure 1:
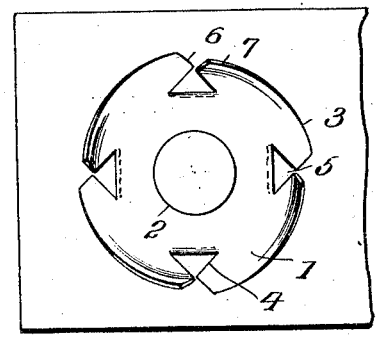
Figure 2:
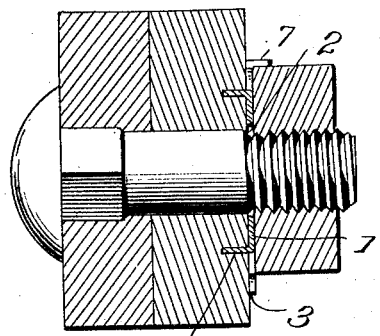
Figure 4:
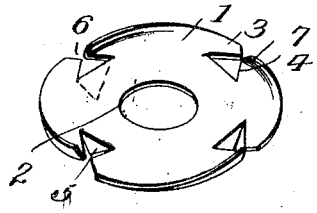
Figure 3:
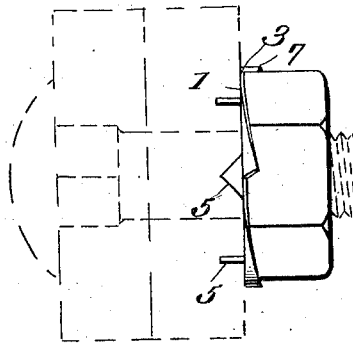
Figure 5:
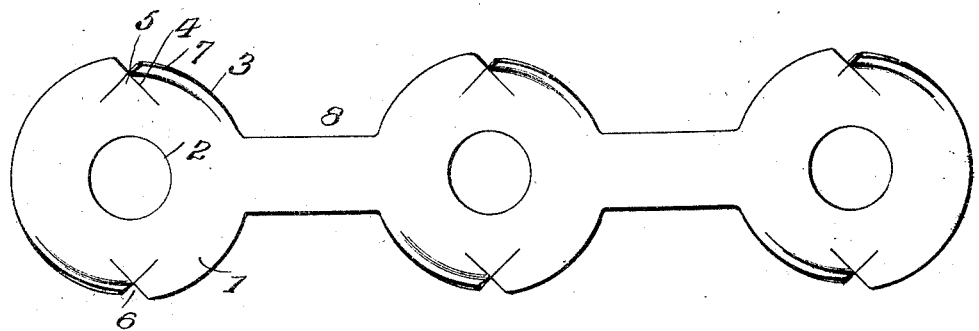

For a full understanding of the invention reference is to be had to the following description and accompanying drawing, in which:

Figure 1 is a plan view of one form of the washer; Fig. 2 is a sectional view of the washer applied to a nut and bolt and wooden base; Fig. 3 is a side elevation of the same; Fig. 4 is a perspective view of the washer; and Fig. 5 is a plan view of a modified form of the washer.

Corresponding and like parts are referred to in the following description and indicated in all the views of the accompanying drawings by the same reference characters.

As illustrated in the accompanying drawing, the washer 1 is formed from a blank of sheet metal and is provided with a central circular bolt opening 2. The periphery of the washer 1 is arcuate, as at 3, and extending in from the said arcuate portions are cruciform incisions 4. These incisions cross each other with the arcuate peripheral portion 3 forming a pointed prong 5, and the material at the peripheral portion beyond the pointed end of the prong 5 is removed leaving a space 6. The marginal portion of the washer 1 at the sides of the space 6 and beyond the pointed end of the prong 5 is distorted, as at 7, out of the plane of the central portion of the washer. The washer may be provided with any number of the cruciform incisions 4.

When the washer is applied to a nut and bolt mounted upon a wooden base, one or more of the prongs 5 are bent down at their pointed end portions and the opening 2 is placed over the bolt. The nut is then screwed upon the end of the bolt, and when it engages the outer face of the washer the points of the bent down prongs 5 are forced into the grain of the wood. When the nut has been sufficiently tightened upon the bolt one corner of the nut is drawn over one set of incisions 4, then by striking the distorted marginal portion 7 of the washer 1 with a hammer or other implement, the said portion is bent down against the corner portion of the nut, and consequently the nut is prevented from unscrewing from the bolt.

The object of providing the distorted marginal portions 7 at both sides of the space 6 is that one or the other of the said portions may be bent down irrespective of the disposition of the thread upon the bolt. That is to say, if there is a right hand thread the marginal portion 7 at one side of the space 6 will be bent down, while if the thread of the bolt is left hand the marginal portion 7 at the other side of the said space 6 is bent down.

In Fig. 5 of the drawing is shown several washers 1 connected together by webs 8. This form of nut lock is designed to be used upon the fish-plates of rail joints, and inasmuch as the said plates are formed from metal, the prongs 5 are not bent down, but remain the same plane as the middle portions of the nut washers. The opening 2 on each washer 1 receives a bolt, consequently the said washers cannot turn with relation to each other or with relation to the bolts. When the nuts are tightened upon the bolts their corner portions are brought over the prongs 5 and the marginal portions 7 of the washers are bent down against the sides of the nuts, in the manner as above indicated.

Having thus described the invention, what is claimed as new is:

A nut lock, comprising a washer provided with a bolt opening and with an arcuate periphery, the washer being incised from its periphery inward, the incisions crossing each other within the periphery of the washer, whereby an angular prong is formed within the marginal portion of the washer, and a section of the marginal portion at the point of the prong is removed leaving an open space, said washer having its marginal portion at the sides of said space and beyond the end of the prong distorted out of the plane of its middle portion, said marginal portion having a blunt end.

In testimony whereof, I affix my signature in presence of two witnesses.

BENJAMIN F. PURVIANCE. [L. S.]

Witnesses:
O. J. WOODBEEK,
A. L. SCOFIELD.